July 23, 1929. M. GLAZER 1,721,816
DEVICE FOR HANDLING PLATE GLASS PANES
Filed June 2, 1928
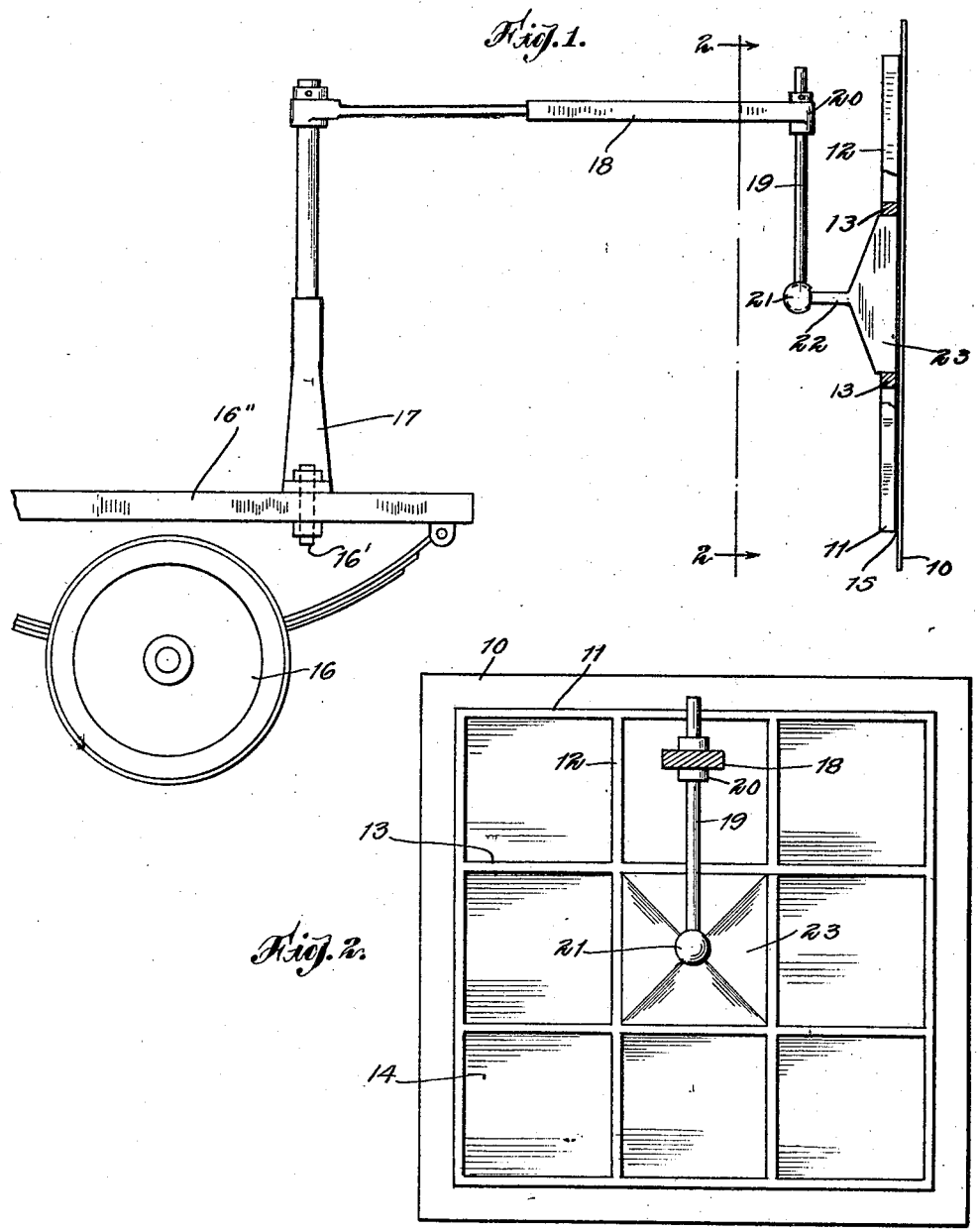
Inventor
Morris Glazer
By his Attorney
George C. Heinrich Patented July 23, 1929.

1,721,816

UNITED STATES PATENT OFFICE.

MORRIS GLAZER, OF BROOKLYN, NEW YORK.

DEVICE FOR HANDLING PLATE-GLASS PANES.

Application filed June 2, 1928. Serial No. 282,427.

This invention relates to improvements in devices for facilitating the handling and storing as well as setting of plate glass in windows, and for protecting the same against breakage or damage, and it is the principal object of my invention to provide a device of this character comprising one or a plurality of frames adapted to be removably attached to the plate glass, and made from a plurality of readily assembled pieces.

Another object of my invention is the provision of a protecting frame for plate glass panes adapted to be readily engaged by suitable means for loading and unloading the plate glass onto and from a vehicle and allowing a safely guiding of the pane to the place in which it is to be set.

A further object of my invention is the provision of a device of the above outlined character which is extremely simple and therefore inexpensive to manufacture, which however is durable and strong and positive as well as efficient in operation.

These and other objects of my invention will become more fully apparent as the description thereof proceeds, and will then be specifically defined in the appended claims.

In the accompanying drawing, forming a material part of this disclosure:

Fig. 1 is a side elevation of a device engaging the plate glass frame constructed according to my invention attached to the glass, and for handling the same during its transportation and the setting operation.

Fig. 2 is a front view of a plate glass pane equipped with a frame constructed according to my invention.

As illustrated, the plate glass pane 10 has attached thereto either to one side face thereof, or to both, as the case may require, a frame 11 composed of a plurality of lengthwise extending slats 12 or the like intersected at certain intervals by cross-slats or bars 13 so as to form a plurality of squares 14 with the plate glass pane extending for some distance beyond the lateral plane of the frame. The frame is attached or secured to the side faces of the plate glass pane by means of any suitable adhesive matter as for instance glued canvas 15 or the like.

In order to facilitate the handling of the plate glass for transportation and during the setting operation, a wheeled vehicle 16 is equipped with a suitable vertical crane 17 rotatably erected as indicated at 16', on a platform 16''. The upper part of the crane is adapted to telescope into its lower or foot part and a horizontal arm 18 made in two telescoping parts is secured to post 17 and is adapted to swing in any desired direction and carries at its outer end a vertical rod or bar 19 rotatably held in a socket 20 at the outer end of the arm 18.

The lower end of bar 19 carries a ball socket 21 with which is formed a horizontal bar 22 carrying a shoe 23 of a form to snugly and tightly fit into any of the squares or chambers, 14, preferably the central one of the frame and frictionally held in engagement therein or by any suitable means.

The operation of my device will be entirely clear from the above description and by simultaneous inspection of the drawing, and it will be evident that the frame 11 will protect the plate glass pane securely during the handling of the same, and can then be readily removed, so that the setting of the glass is greatly facilitated and the liability of damaging or breaking the glass is remote.

The frame will also prevent a promiscuous scattering of the glass pieces in case the plate glass is shattered.

During transportation the central square of the frame is firmly engaged by a shoe which depends from a crane turnable in all directions so that it can readily be swung out or into the vehicle of transportation.

It will be understood that I have described and shown the preferred form of my invention only as one example of the many ways in which my device may be practically constructed and that I may make such changes in the general arrangement and in the construction of the minor details of my invention as come within the scope of the appended claims without departure from the spirit of my invention and the principles involved.

Having thus described my invention, what I claim as new and desire to secure by Letters Patent is:

1. In a device of the class described, the combination of a frame comprising a plurality of squares removably attached to a plate glass pane, with a shoe adapted to snugly and frictionally engage one of the squares formed by said frame, a means for suspending said shoe and a means for swinging said shoe, the pane held thereby and said suspending means onto and from a carrier for the plate glass.

2. A system of transportation of plate glass panes comprising a frame, composed of a plurality of chambers, an adhesive material for securing said frame to the sides of a plate glass pane, a shoe adapted to frictionally engage one of said chambers and to be frictionally held therein, a stem for said shoe, a ball joint for said stem, a vertical bar and a means for swinging said bar, stem, shoe, frame and pane onto or from a carrier for the plate glass.

3. A mechanism for handling plate glass comprising a frame composed of a plurality of lengthwise and crosswise extending intersecting bars to form a plurality of squares, said frame adapted to be attached to the plate glass by an adhesive, a shoe adapted to snugly and tightly fit into one of the said squares, preferably the center one and frictionally held therein, and a means connected to said shoe to facilitate the removal of said glass plate to and from a means of transportation.

Signed at New York, in the county of New York and State of New York, this 1st day of June, A. D. 1928.

MORRIS GLAZER.